United States Patent
Gottscho et al.

(10) Patent No.: US 11,314,674 B2
(45) Date of Patent: Apr. 26, 2022

(54) DIRECT MEMORY ACCESS ARCHITECTURE WITH MULTI-LEVEL MULTI-STRIDING

(71) Applicant: Google LLC, Mountain View, CA (US)

(72) Inventors: Mark William Gottscho, Redwood City, CA (US); Matthew William Ashcraft, San Carlos, CA (US); Thomas Norrie, Mountain View, CA (US); Oliver Edward Bowen, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/838,796

(22) Filed: Apr. 2, 2020

(65) Prior Publication Data

US 2021/0255976 A1 Aug. 19, 2021

Related U.S. Application Data

(60) Provisional application No. 62/977,062, filed on Feb. 14, 2020.

(51) Int. Cl.
*G06F 13/28* (2006.01)
*G06F 1/04* (2006.01)

(52) U.S. Cl.
CPC ............... *G06F 13/28* (2013.01); *G06F 1/04* (2013.01)

(58) Field of Classification Search
CPC ...................................................... G06F 13/28
(Continued)

(56) References Cited

U.S. PATENT DOCUMENTS 4,797,809 A * 1/1989 Sato ...................... G06F 13/28
 345/501
4,855,903 A * 8/1989 Carleton ............. G06F 13/1657
 709/248

(Continued)

FOREIGN PATENT DOCUMENTS

EP 3430521 1/2019

OTHER PUBLICATIONS

PCT International Search Report and Written Opinion in International Application No. PCT/US2020/062605, dated Mar. 12, 2021, 13 pages.

*Primary Examiner* — Paul R. Myers
(74) *Attorney, Agent, or Firm* — Fish & Richardson P.C.

(57) ABSTRACT

DMA architectures capable of performing multi-level multi-striding and determining multiple memory addresses in parallel are described. In one aspect, a DMA system includes one or more hardware DMA threads. Each DMA thread includes a request generator configured to generate, during each parallel memory address computation cycle, m memory addresses for a multi-dimensional tensor in parallel and, for each memory address, a respective request for a memory system to perform a memory operation. The request generator includes m memory address units that each include a step tracker configured to generate, for each dimension of the tensor, a respective step index value for the dimension and, based on the respective step index value, a respective stride offset value for the dimension. Each memory address unit includes a memory address computation element configured to generate a memory address for a tensor element and transmit the request to perform the memory operation.

18 Claims, 9 Drawing Sheets

(58) Field of Classification Search
USPC .......................................................... 710/22
See application file for complete search history.

(56) References Cited

U.S. PATENT DOCUMENTS

| | | | | |
|---|---|---|---|---|
| 4,920,480 | A * | 4/1990 | Murakami | G06F 13/28 |
| | | | | 712/36 |
| 5,361,363 | A * | 11/1994 | Wells | G06F 11/08 |
| | | | | 712/16 |
| 5,526,501 | A * | 6/1996 | Shams | G06F 15/8007 |
| | | | | 711/217 |
| 5,590,284 | A * | 12/1996 | Crosetto | G06F 15/17368 |
| | | | | 710/104 |
| 5,628,026 | A * | 5/1997 | Baron | G06F 13/28 |
| | | | | 710/1 |
| 5,649,198 | A * | 7/1997 | Shibata | G06F 9/5066 |
| | | | | 712/13 |
| 5,659,797 | A * | 8/1997 | Zandveld | G06F 13/28 |
| | | | | 710/22 |
| 5,809,334 | A | 9/1998 | Galdun et al. | |
| 6,185,634 | B1 * | 2/2001 | Wilcox | G06F 13/28 |
| | | | | 710/26 |
| 6,687,796 | B1 | 2/2004 | Laine et al. | |
| 6,874,054 | B2 | 3/2005 | Clayton et al. | |
| 7,529,245 | B1 * | 5/2009 | Muller | H04L 49/90 |
| | | | | 370/394 |
| 7,577,772 | B2 | 8/2009 | Sonksen et al. | |
| 8,843,727 | B2 | 9/2014 | Schoinas et al. | |
| 9,836,691 | B1 | 12/2017 | Narayanaswami et al. | |
| 9,946,539 | B1 * | 4/2018 | Temam | G06F 17/16 |
| 10,699,182 | B2 * | 6/2020 | Gulland | G06F 17/16 |
| 2004/0068603 | A1 * | 4/2004 | Augsburg | G06F 13/362 |
| | | | | 710/310 |
| 2005/0182999 | A1 * | 8/2005 | Rudosky | H03M 13/4169 |
| | | | | 714/796 |
| 2005/0199716 | A1 * | 9/2005 | Shafer | H04L 29/12783 |
| | | | | 235/385 |
| 2006/0047864 | A1 * | 3/2006 | Brokenshire | G06F 13/28 |
| | | | | 710/22 |
| 2006/0259658 | A1 * | 11/2006 | Connor | G06F 12/0862 |
| | | | | 710/22 |
| 2007/0169059 | A1 * | 7/2007 | Halambi | G06F 8/4452 |
| | | | | 717/160 |
| 2007/0240142 | A1 * | 10/2007 | Brokenshire | G06F 8/4441 |
| | | | | 717/159 |
| 2008/0243757 | A1 * | 10/2008 | Chen | G06F 13/28 |
| 2009/0125647 | A1 * | 5/2009 | Shasha | G06F 13/28 |
| | | | | 710/22 |
| 2010/0020817 | A1 * | 1/2010 | Ebisuzaki | G06F 11/2007 |
| | | | | 370/440 |
| 2010/0180100 | A1 * | 7/2010 | Lu | G06F 12/0862 |
| | | | | 712/22 |
| 2011/0078342 | A1 * | 3/2011 | Siddabathuni | G06F 13/28 |
| | | | | 710/22 |
| 2012/0290815 | A1 * | 11/2012 | Takahashi | G06F 12/0886 |
| | | | | 712/30 |
| 2014/0237214 | A1 * | 8/2014 | Lieske | G06F 9/3887 |
| | | | | 712/14 |
| 2015/0109153 | A1 * | 4/2015 | Wu | H03M 7/40 |
| | | | | 341/65 |
| 2016/0162402 | A1 * | 6/2016 | Woolley, Jr. | G06K 9/00288 |
| | | | | 711/202 |
| 2017/0192720 | A1 * | 7/2017 | Hong | G06F 13/1626 |
| 2017/0316312 | A1 | 11/2017 | Goyal et al. | |
| 2019/0243790 | A1 | 8/2019 | Li et al. | |
| 2020/0119736 | A1 * | 4/2020 | Weber | H01L 25/50 |
| 2020/0371978 | A1 * | 11/2020 | Simpson | G06F 13/28 |

\* cited by examiner

280

281
282
283
284
285

```
for (int i₀ = 0; i₀ < steps_per_stride_0; ++i₀)
  for (int i₁ = 0; i₁ < steps_per_stride_1; ++i₁)
    for (int i₂ = 0; i₂ < steps_per_stride_2; ++i₂)
      for (int i₃ = 0; i₃ < stepts_per_stride_3; ++i₃)
        dimension _memory_address_offset_0 = (i₀ * stride_dimension_offset_value_0);
        dimension _memory_address_offset_1 = (i₁ * stride_dimension_offset_value_1);
        dimension _memory_address_offset_2 = (i₂ * stride_dimension_offset_value_2);
        dimension _memory_address_offset_3 = (i₃ * stride_dimension_offset_value_3);

memory address = (base_address +
                         dimension _memory_address_offset_0 +
                         dimension _memory_address_offset_1 +
                         dimension _memory_address_offset_2 +
                         dimension _memory_address_offset_3);
```

DIRECT MEMORY ACCESS ARCHITECTURE WITH MULTI-LEVEL MULTI-STRIDING

CROSS-REFERENCE TO RELATED APPLICATIONS

This application claims the benefit under 35 U.S.C. § 119(e) of U.S. Patent Application No. 62/977,062, entitled "Direct Memory Access Architecture with Multi-Level Multi-Striding," filed Feb. 14, 2020. The disclosure of the foregoing application is incorporated herein by reference in its entirety for all purposes.

BACKGROUND

Direct memory access (DMA) is a capability that enables devices or subsystems to access memory independent of the processor. This frees up the processor from involvement with the data transfer, making the processor available to perform other operations. DMA can be used to offload expensive memory operations from the processor, such as large memory transfer operations and scatter-gather operations.

SUMMARY

This specification describes technologies relating to DMA architectures that are capable of performing multi-level multi-striding and determining multiple memory addresses in parallel, e.g., during a single clock cycle.

In general, one innovative aspect of the subject matter described in this specification can be embodied in a direct memory access (DMA) system that includes one or more hardware DMA threads. Each DMA thread includes a request generator configured to generate, during each parallel memory address computation cycle, (i) m memory addresses for a multi-dimensional tensor in parallel and, for each memory address, (ii) a respective request for a memory system to perform a memory operation for the multi-dimensional tensor. The request generator includes m memory address units. Each memory address unit includes a step tracker configured to generate, for each dimension of the multi-dimensional tensor, (i) a respective step index value for the dimension and, based on the respective step index value, (ii) a respective stride offset value for the dimension and a memory address computation element configured to generate, during each parallel memory address computation cycle and based on each respective stride offset value, a memory address for a tensor element of the multi-dimensional tensor and transmit, to the memory system, the request to perform the memory operation using the memory address, where m is greater than or equal to one. Other implementations of this aspect include corresponding apparatus and methods.

These and other implementations can each optionally include one or more of the following features. In some aspects, the request generator is configured to generate the memory addresses in parallel during a single clock cycle and each parallel memory computation is performed during a single clock cycle. During each clock cycle, the memory address computation element of each memory address unit generates a memory address for a same or different tensor element than the memory address computation element of each other memory address unit.

In some aspects, the request generator is configured to receive, for the multi-dimensional tensor, a descriptor that defines, for each dimension, a respective steps for stride value for the dimension. The request generator can include m lanes that each include a respective step tracker and a respective memory address computation element. The respective step tracker and respective memory address computation element of each lane computes a corresponding memory address in parallel with each other lane. The step trackers can be configured to generate the memory addresses for the multi-dimensional tensor based on a loop nest that includes, for each dimension of the multi-dimensional tensor, a respective loop for traversing the dimension of the multi-dimensional tensor. The steps per stride value for each dimension represents a loop bound for the respective loop for the dimension and the step index value for each dimension represents a loop index for the respective loop for the dimension.

In some aspects, each step tracker is configured to update the step index value for each of the dimensions during each clock cycle. A combination of the step index values for each step tracker can be different from a combination of the step index values for each other step tracker. Each step tracker can include a step incrementer chain that includes multiple step incrementers each configured to determine a dimension memory address offset value for a respective dimension. A first step incrementer of the step incrementer chain corresponding to an innermost loop of the loop nest can be configured to receive an advance amount. Updating the step index value for one or more of the dimensions during each clock cycle can include updating, by the first step incrementer, the step index value for the one or more dimensions based on the advance amount.

In some aspects, each of one or more second step incrementers of the step incrementer chain corresponding to a loop in which the innermost loop is nested is configured to receive, from a previous step tracker in the step incrementer chain, a wrap amount. Updating the step index value for one or more of the dimensions during each clock cycle can include updating, by the second step incrementer, the step index value for the one or more dimensions based on the wrap amount.

Some aspects can include a progress tracker that includes a response reorder unit and a synchronization unit. The response reorder unit can be configured to maintain, for each tensor, a status of whether a memory operation for the tensor element has been performed. The synchronization unit can be configured to provide, to a processor core, multiple partial updates that each specify an overall status of memory operations performed on the tensor elements of the multi-dimensional tensor.

In some aspects, each request includes a unique identifier. The response reorder unit can be configured to receive responses from the memory system in any order. Each response can include the unique identifier of the request for which the response is provided. The response reorder unit can be configured to release a set of unique identifiers for re-use by the request generator when at least a threshold number of consecutive unique identifiers are received in the responses.

In general, another innovative aspect of the subject matter described in this specification can be embodied in a system that includes one or more processor cores, a memory system, and a DMA engine that includes one or more DMA threads. Each DMA thread can include a request generator configured to generate, during each parallel memory address computation cycle, (i) m memory addresses for a multi-dimensional tensor in parallel and, for each memory address, (ii) a respective request for a memory system to perform a memory operation for the multi-dimensional tensor, wherein the request generator comprises m memory address units, where m is greater than or equal to one. Each memory address unit can include a step tracker configured to generate, for each dimension of the multi-dimensional tensor, (i) a respective step index value for the dimension and, based on the respective step index value, (ii) a respective stride offset value for the dimension and a memory address computation element configured to generate, during each parallel memory address computation cycle and based on each respective stride offset value, a memory address for a tensor element of the multi-dimensional tensor and transmit, to the memory system, the request to perform the memory operation using the memory address. Each DMA thread can include a progress tracker that includes a response reorder unit and a synchronization update unit configured to provide, to the one or more processor core, partial synchronization updates for memory operations managed by the DMA engine. Other implementations of this aspect include corresponding apparatus and methods.

These and other implementations can each optionally include one or more of the following features. In some aspects, the request generator is configured to generate the memory addresses in parallel during a single clock cycle and each parallel memory computation is performed during a single clock cycle.

During each clock cycle, the memory address computation element of each memory address unit can generate a memory address for a same or different tensor element than the memory address computation element of each other memory address unit. The request generator can be configured to receive, for the multi-dimensional tensor, a descriptor that defines, for each dimension, a respective steps for stride value for the dimension. The request generator can include m lanes that each include a respective step tracker and a respective memory address computation element, wherein the respective step tracker and respective memory address computation element of each lane computes a corresponding memory address in parallel with each other lane.

In general, another innovative aspect of the subject matter described in this specification can be embodied in a method performed by a DMA system. The method includes generating, by a request generator and during each parallel memory address computation cycle, (i) m memory addresses for a multi-dimensional tensor in parallel and, for each memory address, (ii) a respective request for a memory system to perform a memory operation for the multi-dimensional tensor, wherein the request generator comprises m memory address units, wherein m is greater than or equal to one, and wherein each memory address unit comprises a step tracker and a memory address computation unit; generating, by the step tracker of each memory address unit and for each dimension of the multi-dimensional tensor, (i) a respective step index value for the dimension and, based on the respective step index value, (ii) a respective stride offset value for the dimension; generating, by the memory address computation element of each memory address unit and during each parallel memory address computation cycle, a memory address for a tensor element of the multi-dimensional tensor based on each respective stride offset value; and transmitting, to the memory system, the request to perform the memory operation using the memory address.

The subject matter described in this specification can be implemented in particular embodiments so as to realize one or more of the following advantages. The DMA architectures described in this document enable the generation of multiple (m) memory addresses for a multi-dimensional tensor in parallel, e.g., per clock cycle, which provides faster memory address generation and higher memory throughput. The DMA architectures can include multiple lanes that each have a step tracker that performs multi-striding techniques to compute memory addresses for tensor elements in parallel based on a loop nest for the multi-dimensional tensor. The techniques used by request generators of the DMA architectures enable the multiple step trackers to operate in parallel using different step index values for the multiple dimensions of the tensor to generate addresses for different tensor elements in parallel during a clock cycle and independent of each other step tracker. Each step tracker can update its step index values during each clock cycle in preparation for determining the memory address for its next tensor element.

The DMA architectures can also include progress trackers that provide partial synchronization updates to a processor core that will consume data stored in the memory at the determined memory addresses. This enables the processor core to begin consuming data prior to an entire DMA memory transaction being completed, thereby reducing the latency imposed on the processor core by memory transfers and increasing the overall efficiency of the processor's computations. The progress trackers can include response reorder units that can receive multiple responses at a time and in any order from memories that can handle and respond to the generated requests out of order. As the size of the response reorder unit is limited, the response reorder unit can release identifiers for requests when responses for at least a threshold number of requests have been received. This enables the request generator to use the released identifiers to continue issuing memory requests without waiting for responses to all of the maximum number of requests, thereby increasing the speed and efficiency of memory transfers.

Various features and advantages of the foregoing subject matter is described below with respect to the figures. Additional features and advantages are apparent from the subject matter described herein and the claims.

BRIEF DESCRIPTION OF THE DRAWINGS

FIG. 2B depicts example pseudocode for determining memory addresses.

Like reference numbers and designations in the various drawings indicate like elements.

DETAILED DESCRIPTION

In general, this document describes DMA architectures that are capable of performing multi-level multi-striding and determining multiple memory addresses in parallel, e.g., during and within a single clock cycle. A chip can include one or more DMA engines that offload the memory transfer operations from the processor core(s) of the chip. Each DMA engine can include one or more DMA threads. Each DMA thread is a hardware unit that manages the execution of DMA transactions on behalf of the core(s). The clock cycle can be the time required for the execution of one operation by a DMA engine or a core.

The example DMA architectures illustrated in FIGS. 1-6 and described below provide a design that can support up to four tensor dimensions and up to four source and four destination memory addresses per clock cycle. However, the DMA architectures do not specifically apply to just four dimensions or four addresses per cycle. Similar architectures can be used for other numbers of dimensions and addresses per cycle. In addition, the number of addresses per cycle can differ from the number of dimensions of the tensors for which addresses will be determined. For example, a DMA thread can include five lanes to generate five addresses per cycle, while the hardware is configured to compute addresses for tensors having up to four dimensions, up to 10 dimensions, or another maximum number of dimensions. That is, the architecture is parameterizable and the choice of settings depends on the area/frequency goals for the design.

Figure 1:
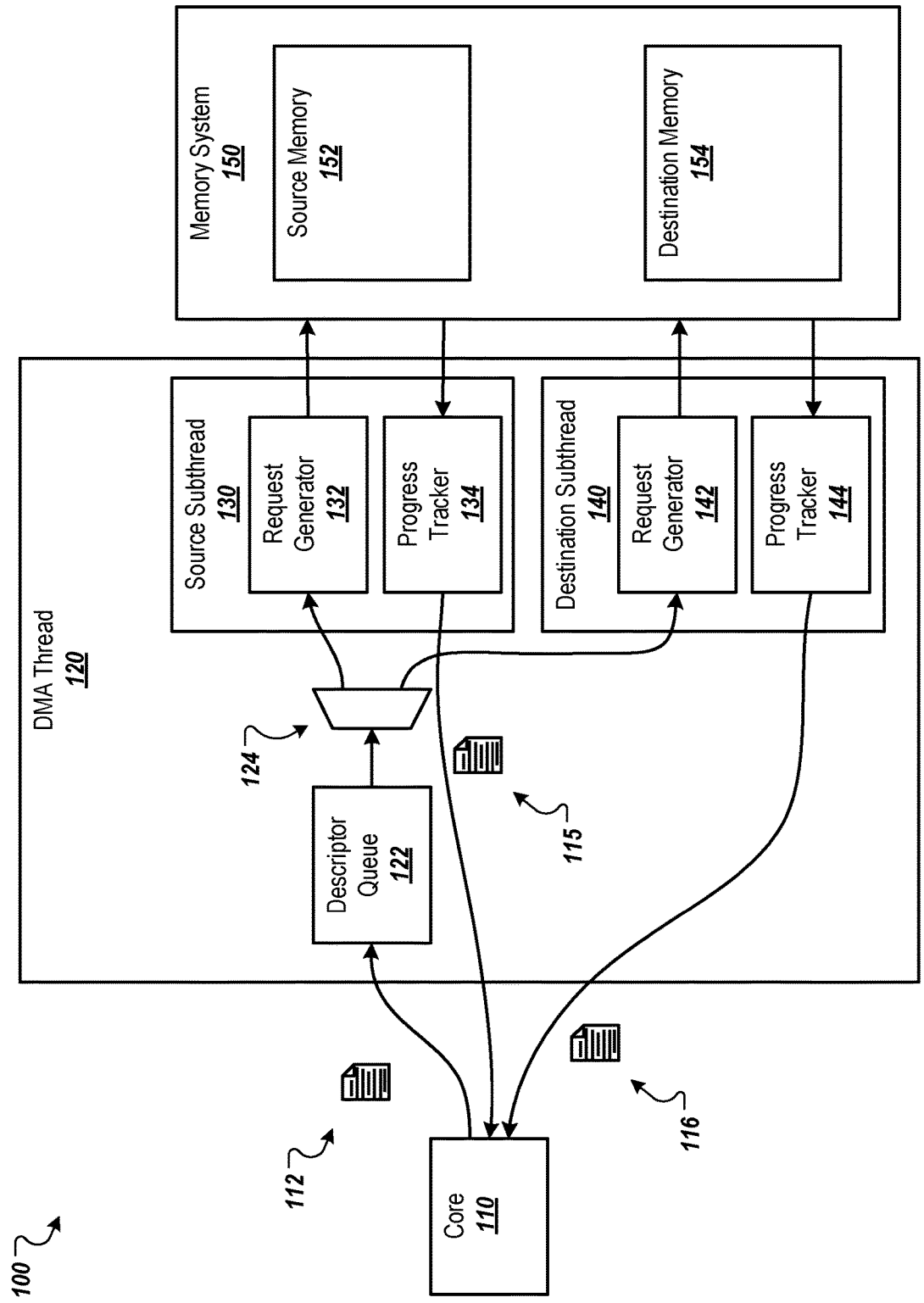
FIG. 1 is a diagram of an example environment in which a DMA thread generates and tracks progress of memory operations.

FIG. 1 is a diagram of an example environment 100 in which a DMA thread 120 generates and tracks progress of memory operations. The DMA thread 120 can generate and track the progress of the memory operations as part of a transaction that is requested on behalf of a processor core. The DMA thread 120 is a hardware unit that can be part of a DMA engine that includes the DMA thread 120 and optionally one or more additional DMA threads. The DMA thread 120 can manage DMA transactions, such as scatter-gather and other memory transfer operations, for one or more processor cores, including the core 110. For example, the DMA thread 120 can orchestrate the transfer of multi-dimensional tensors between different memories of a memory system on a chip that includes the core 110 and the DMA thread 120. The DMA thread 120 orchestrates the data movement by sending requests (commands) into the memory system and tracks completion of those requests so that it can synchronize progress with the core that requested the transaction. Once the read/write requests/commands are in the memory system, it can service each request independently without regard for request ordering. The DMA thread 120 handles the ordering of the requests/responses and synchronization with the core. Offloading these memory operations to the DMA thread 120 frees up compute cycles on the core 110 for other tasks, e.g., performing machine learning computations, reshaping tensors, etc.

The core 110 can request a DMA transaction by sending a descriptor 112 to the DMA thread 120. Each DMA transaction can include one or more memory transfer operations. The descriptor 112 includes information about the DMA transaction. For example, the descriptor 112 can include information specifying source memory 152 of a memory system 150 from which data will be read (e.g., the memory address(es) of the source memory 152), destination memory 154 to which the data will be written (e.g., the memory address(es) of the destination memory 154), the size and shape (e.g., the dimensions) of a source tensor for which tensor elements are stored in the source memory 152, and a size and shape of a destination tensor for which tensor elements will be stored in the destination memory 154. A tensor element is a piece of data in the tensor that corresponds to a particular indexed location in the tensor.

The size and shape of the source tensor can be the same or different from the size and shape of the destination tensor. For example, the size and shape can be different if the tensor is being reshaped by the core 110. The descriptor 112 can define the size and shape of each tensor using a steps-per-stride value for each dimension of the tensor. In a for loop, the step size is the size of the increment for each iteration of the loop and the steps-per-stride is the total number of steps before the loop resets, e.g., the loop bound for the loop.

For example, the steps-per-stride for a dimension of a tensor can be equal to the number of tensor elements across that dimension. In particular, a 8×6×4×2 four dimensional tensor can have a steps-per-stride of 8 for a first dimension, a steps-per-stride of 6 for a second dimension, a steps-per-stride of 4 for a third dimension, and steps-per-stride of 2 for a fourth dimension. As described in more detail below, the steps-per-stride can be used to traverse each dimension of the tensor and compute memory addresses for the tensor elements.

The descriptor 112 can also include a stride dimension offset value for each dimension. These stride dimension offset values (also referred to as dimension offset values) are used to determine memory addresses for tensor elements, as described below. The dimension offsets are stride distances. At each step of the process along a tensor dimension, the DMA thread 120 "hops" the memory address by the stride dimension offset value. The descriptor 112 can include, for the source tensor, a stride dimension offset value for each dimension of the source tensor. The descriptor 112 can also include, for the destination tensor, a stride dimension offset value for each dimension of the destination tensor.

The DMA thread 120 includes a descriptor queue 122 that stores descriptors 112. For example, the DMA thread 120 can execute multiple DMA threads sequentially based on the descriptors 112 received and stored in the descriptor queue 122. In some implementations, the descriptor queue 122 is a first-in, first-out (FIFO) queue such that the DMA thread 120 executes DMA transactions in the order in which the descriptors 112 for the DMA transactions are received. The execution of DMA transactions is fully pipelined and can be implemented in a way that performs out-of-order operations, but appears to the processor to execute in program order.

The DMA thread 120 also includes a descriptor splitter 124. The descriptor splitter 124 can extract, from a descriptor 112, the information used by a source subthread 130 and the information used by a destination subthread 140 and provide the appropriate information to each subthread 130 and 140.

In general, the source subthread 130 generates read requests to read data from source memory 152, sends the read requests to the memory system 150, tracks the progress of the read operations, and synchronizes the core 110 with the progress of the read operations. Similarly, the destination thread 140 generates write requests to write data to destination memory 154, sends the write requests to the memory system 150, tracks the progress of the write operations, and synchronizes the core 110 with the progress of the write operations. The memory system 150 can be the main memory for the core 110 or for a chip that includes the core 110, e.g., random access memory (RAM) for the core 110 or chip. The memory system implements the actual memory interconnect so that data that is read for each source memory read request gets paired with the write request to the destination memory. The data never passes through the DMA thread (request addresses are sent out and responses are received but those responses and requests carry no memory data).

The source subthread 130 includes a request generator 132 that generates the read requests based on the descriptor 112. As described in more detail below, the request generator 132 can generate multiple memory addresses in parallel, e.g., per clock cycle, and generate a read request for each memory address. For example, the request generator 132 can generate a respective memory address for each of multiple tensor elements during a single clock cycle of the core 110 as it traverses a multi-dimensional tensor. Each read request can include a request identifier "request ID"), the memory address from which data is to be read, a memory opcode. The request IDs can be sequence numbers or tags that are used to associate the requests with responses since the responses can be received out of order, as described below. The memory opcode indicates the memory operation, e.g., whether the request is for a read, write, memset, or another operation targeting the memory address of the request.

The source subthread 130 also includes a progress tracker 134 that tracks the progress of the read operations specified by the read requests. For example, the memory system 150 can send, to the progress tracker 134, read responses to signal that the read operation has been completed. Each read response can include the request ID of the read request for which the response is being sent. In this way, the progress tracker 134 can use the request IDs to track the progress of the DMA transactions.

The destination subthread 140 includes a request generator 142 that generates the write requests based on the descriptor 112. As described in more detail below, the request generator 142 can generate multiple memory addresses in parallel, e.g., per clock cycle, and generate a write request for each memory address. For example, the request generator 142 can generate a respective memory address for each of multiple tensor elements during a single clock cycle of the core 110 as it traverses a multi-dimensional tensor. Each write request can include a request ID and specify the memory address to which data is to be written.

The destination subthread 140 also includes a progress tracker 134 that tracks the progress of the write operations specified by the write requests. For example, the memory system 150 can send, to the progress tracker 144, write responses to signal that the write operation has been completed. Each write response can include the request ID of the write request for which the response is being sent. In this way, the progress tracker 144 can use the request IDs to track the progress of the DMA transactions.

The progress trackers 134 and 144 can send synchronization messages 115 and 116, respectively, to the core 110 to update the core 110 on the progress of the DMA transaction corresponding to the descriptor 112. The synchronization messages 115 and 116 can specify a level of completion (e.g., a percentage or total number of memory operations completed) and/or the request IDs for which a response has been received.

As described below, the progress trackers 134 and 144 can send synchronization messages 115 and 116 that provide partial, or incomplete, updates on the progress of the DMA transaction. For example, each progress tracker 134 and 144 can be configured to send a synchronization message 115 and 116 each time a specified number, e.g., a threshold number, of responses have been received for the DMA transaction. In a particular example, each progress tracker 134 and 144 can be configured to send a synchronization message 115 and 116 each time responses have been received for a continuous sequence of at least a threshold number of request IDs. As the core 110 can know the order in which the memory operations are being performed (and therefore the order in which the tensor elements are being moved), the core 110 can begin processing the data that has been transferred based on these partial updates without having to wait for the entire set of DMA transactions to be completed.

Using separate subthreads for the read and write operations enables higher throughput. For example, if each subthread 130 and 140 can generate a particular number of requests in parallel per clock cycle, e.g., four requests per clock cycle, then the total number of requests generated by the two subthreads 130 and 140 is double the particular number, e.g., eight requests.

In some cases, multiple DMA threads can be used to execute a DMA transaction. For example, if the bandwidth of the memory is sufficient to handle more requests per clock cycle than a single DMA thread can generate, multiple DMA threads can be used to generate the requests. If multiple DMA threads are used to transfer data of a multi-dimensional tensor, each DMA thread can receive a descriptor for a portion of the multi-dimensional tensor, e.g., a slice of the tensor. The descriptor can specify the size and shape of the slice of the tensor and the memory addresses, similar to the descriptor for a full tensor.

Figure 2A:
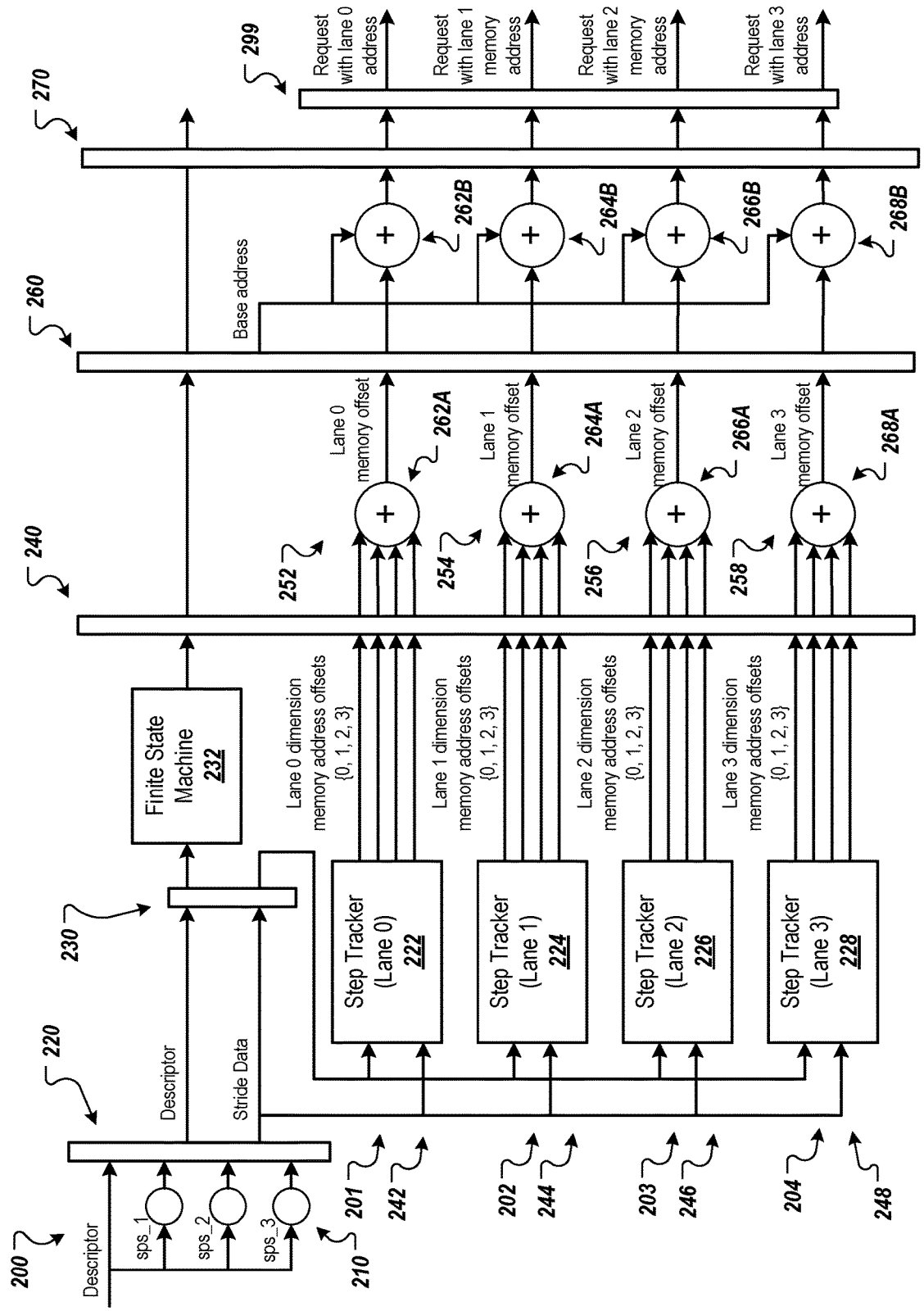
FIG. 2A is a diagram of an example request generator.

FIG. 2A is a diagram of an example request generator 200, which can be used to implement each of the request generators 132 and 142 of FIG. 1. In this example, the request generator 200 is configured for implementations in which there are up to four tensor dimensions and up to four memory addresses can be generated per clock cycle.

In general, the request regenerator 200 can determine memory addresses for tensor elements in a multi-dimensional tensor or other multi-dimensional data structure (referred to herein as a tensor for brevity). The request generator 200 can determine the memory addresses so that data of the tensor can be read from memory and/or written to memory. The request generator 200 can compute a memory address for a tensor element based on step index values of the tensor element that defines the location of the tensor element within the tensor. The example request generator 200 is implemented with a five stage design with pipeline registers 220, 230, 240, 260, and 270 between adjacent stages.

To determine the memory addresses, the request generator 200 can traverse each dimension by stepping through each step index value for each dimension. For example, if a dimension includes ten elements, the request generator 200 can step through the step index values in order from one to ten. Conceptually, this can be performed using a loop nest that includes a loop for each dimension of the tensor. In such an example, a dimension of the tensor can be traversed using its loop by incrementing the step index value for the loop for each iteration of the loop until a loop bound equal to the number of elements in the loop is reached. When the loop bound is reached, a next outer loop is incremented and the current loop resets to the first step index value corresponding to the first element in the dimension. The innermost loop can include a memory address computation to determine the memory address for the tensor element at the location within the tensor that corresponds to the step index values of the four loops in the loop nest. Example pseudocode 280 for determining memory addresses using four loops is shown in FIG. 2B.

Referring to FIG. 2B, the pseudocode 280 includes four loops 281-284 that are used to traverse the four dimensions of a tensor. The illustrated pseudocode 280 describes half of a transaction (either the source-side reads or destination-side writes). The same or similar pseudocode can be independently instantiated twice for the full transaction. In the pseudocode 280, the loop bound (steps_per_stride) for each dimension is the same for both the source-side and destination-side of the transfer but the stride offset values (stride_dimension_offset_value_i) can be different. That is, steps_per_stride_0 is the same in the pseudocode for the source-side and the destination-side, but stride_dimension_offset_value_0 in the source-side pseudocode may be different from stride_dimension_offset_value_0 in the destination pseudocode.

The outermost loop 281 corresponds to one of the dimensions and includes a step index value $i_0$ and a loop bound of steps_per_stride_0. The loop bound steps_per_stride_0 can be equal to the number of elements in the dimension corresponding to the outermost loop 281. Similarly, the loop 282 corresponds to one of the dimensions and includes a step index value $i_1$ and a loop bound of steps_per_stride_1 (which can be equal to the number of elements in the dimension corresponding to the loop 282) and the loops 283 corresponds to one of the dimensions and includes a step index value $i_2$ and a loop bound of steps_per_stride_2 (which can be equal to the number of elements in the dimension corresponding to the loop 283).

The innermost loop 284 also corresponds to one of the dimensions and includes a step index value $i_3$ and a loop bound of steps_per_stride_3 (which can be equal to the number of elements in the dimension corresponding to the innermost loop 284). For each iteration of the innermost loop, a dimension memory address offset value would be computed for each dimension of the tensor using functions 285 and these dimension memory address offset values are used to determine a memory address for the tensor element corresponding to the step index values $i_0$-$i_3$ using function 286. The dimension memory address offset value (destination_memory_address_offset_0) for the dimension corresponding to the outermost loop 281 is equal to the product of the step index value $i_0$ for the loop and a stride dimension offset value (stride_dimension_offset_value_0) for the dimension. A dimension memory address offset value is determined for each other dimension in a similar manner, as shown in FIG. 2B. The stride dimension offset values for the dimensions can be included in a descriptor, as described above.

The memory address for the tensor element can then be computed based on a base memory address and the dimension memory address offset value for each dimension of the tensor. For example, the memory address for a tensor element can be based on, e.g., equal to, the sum of the base memory address and the dimension memory address offset value for the dimensions, as shown in FIG. 2B.

Returning to FIG. 2A, the request generator 200 can perform similar memory address computations in parallel, e.g., without actually iterating the loops. In this example the request generator 200 includes four lanes 201-204 for computing four memory addresses in parallel, e.g., within one clock cycle. In other examples, two or more lanes can be used to compute two or more memory addresses in parallel, e.g., three lanes for three memory address, five lanes for five memory addresses, and so on. That is, the request generator 200 can include m lanes to compute m memory addresses in parallel, where m is greater than or equal to one. The request generator 200 can compute m memory addresses during a parallel memory address computation cycle, which can have a duration that is less than or equal to a single clock cycle.

The number of lanes can be the same as, or different from, the number of dimensions of the tensors. For example, the request generator 200 can be used to compute memory addresses for tensors having different numbers of dimensions, based on the information included in a descriptor 112.

For example, the request generator 200 having four lanes can compute up to four memory addresses per cycle for a three-dimensional tensor using up to all four lanes. The same request generator 200 can also compute up to four addresses per cycle for a one, two, or four-dimensional tensor using up to all four lanes.

Performing such computations in parallel based on the multi-level multi-striding (four level multi-striding in this example) can be difficult as each lane 201-204 has to compute a memory address for a different tensor element than each other lane and each lane operates independently of each other lane. As each lane 201-204 computes a memory address in parallel, e.g., at the same time, one lane cannot wait for the other lane to complete and then iterate one or more loops to determine the memory address for the next tensor element. Instead, each lane has to be able to determine its next tensor element (e.g., the step index values for its next tensor element) and determine the memory address for that tensor element without waiting on another lane.

The request generator 200 includes, for each lane 201-204 (and therefore for each parallel memory address computation), a memory address unit 242-248. Each memory address unit 242-248 includes a respective step tracker 222-228 and a respective memory address computation element 252-258. In general, the step trackers 222-228 are configured to step through the tensor elements of the tensor and determine the dimension memory address offset values for the tensor elements. The memory address computation elements 252-258 are configured to determine the memory addresses for the tensor elements using the dimension memory address offset values received from the step trackers 222-228.

The request generator 200 includes computation elements 210 that pre-compute values for the step trackers 222-228. For example, the computation elements 210 can precompute various step comparison values that can be used by the step trackers 222-228 to determine the next step index values for a next tensor element for which a memory address will be determined. As described below, a comparison of the current step index value to the step comparison values can be used along with other criteria to determine the next step index value. The computation elements 210 can precompute step comparison values for each dimension of the tensor. These step comparison values can be, for example, the steps-per-stride for the dimension minus one, the steps-per-stride for the dimension minus two, the steps-per-stride for the dimension minus three, and so on depending on the number of dimensions of the tensor for the current descriptor 112 for which the request generator 200 is generating memory addresses and sending requests. The computation elements 210 are optional as are the pre-computed values. Pre-computing the values can help improve critical path timing on the next clock cycle.

The computation elements 210 can include a set of hardware adders that precompute the step comparison values and store the step comparison values in a register 220 (or other appropriate data storage element). The computation elements 210 can compute the comparison offset values based on the steps-per-stride values received in a descriptor. The descriptor can include a steps-per-stride value for one or more of the dimensions. In this example, the descriptor can include the steps-per-stride value for dimensions 1-3 (sps_1 to sps_3), but not for dimension 0 (e.g., the dimension corresponding to the outermost loop). For example, if the steps-per-stride variables are represented using 32-bit signed integers, then the steps-per-stride value for dimension 0 can be implied to be the maximum integer value, e.g., the maximum integer value that can be stored in a signed 32-bit integer. In another example, the steps-per-stride value can be included in the descriptor, but not shown in FIG. 2A.

As the steps-per-stride values can vary based on the size and shape of the tensor, the computation elements 210 can precompute the step comparison values for each descriptor and store the step comparison values in the register 220. The descriptors can also be stored in the register 220.

The request generator 200 also includes a finite state machine (FSM) 232. The FSM 232 can initialize and control the step trackers 222-228 based on information from the descriptor 112. For example, the FSM 232 can obtain the descriptor information from a register 230 and determine, based on the descriptor information, the number of requests that will be sent for a DMA transaction defined by the descriptor. This number can be the number of tensor elements in the tensor. The FSM 232 can track the number of remaining requests to be sent and send, to each step tracker 222-224 an advance amount that is based on this number of remaining requests. The advance amount defines the number of memory addresses to be computed during the next cycle of memory address computations performed by the memory address computation elements 252-258.

For example, during the course of executing a DMA transaction using all four lanes 201-204, the advance amount may be equal to four. However, if the total number of memory addresses to be computed for the DMA transaction is less than four, the advance amount for the last cycle will be less than four. For example, if the total number of memory addresses is 18, the FSM 232 would provide an advance amount of four to each step tracker 222-228 for the first four cycles, and then provide an advance amount of two for the final cycle.

The FSM 232 can also stall the step trackers 232. For example, as described below, the progress trackers 134 and 144 may only track the progress of a particular number of requests at one time. The request generator 200 can stall itself, e.g., stalling the step trackers 232, when it runs out of allocated request IDs. The progress trackers 134 and 144 can return request ID credits when request IDs are freed and can be re-allocated, e.g., when a response is received for at least a threshold number of sequential request IDs as described below.

The request generators 132 and 142 can also stall due to external interconnect backpressure (i.e., the memory system cannot yet accept new requests). In some implementations, each DMA thread 120 can be independently throttled using a hardware FSM that is configurable by software. Software can set a target request generation bandwidth for each DMA thread 120 over a configurable sampling window and the DMA thread 120 will automatically stall its pipeline once the allocated bandwidth has been reached. Thus, the DMA thread 120 can be stalled in three different circumstances: memory system network backpressure, request bandwidth throttling, and exhausted request ID allocation (waiting on progress tracker to return credit).

Each step tracker 222-228 uses the advance amount received from the FSM 232, a current step index value for each dimension of the tensor, and the steps-per-stride value for each dimension to determine a next step index value for each dimension. Each step tracker 222-228 also determines a dimension memory address offset value for each dimension based on the next step index value for the dimension and the stride dimension offset value for the dimension. Each step tracker 222-228 outputs the determined dimension memory address offset values to its corresponding memory address computation element 252-258 via a register 240. As described below, the memory address computation elements 252-258 determine the memory address for a tensor element based on the received dimension memory address offset values.

The step trackers 222-228 determine the dimension memory address offset values for different tensor elements than each other. For example, consider a 2×2×2×2 tensor (or other shape tensor) that includes 16 total tensor elements. As the four lanes 201-204 generate four requests per cycle, each step tracker 222-228 would determine the dimension memory address offset values for a total of four of the 16 tensor elements. For example, the step tracker 222 can determine the dimension memory address offset values for a first, fifth, ninth, and thirteenth tensor elements, while the step tracker 224 determines the dimension memory address offset values for a second, sixth, tenth, and fourteenth tensor elements, and so on.

Figure 3:
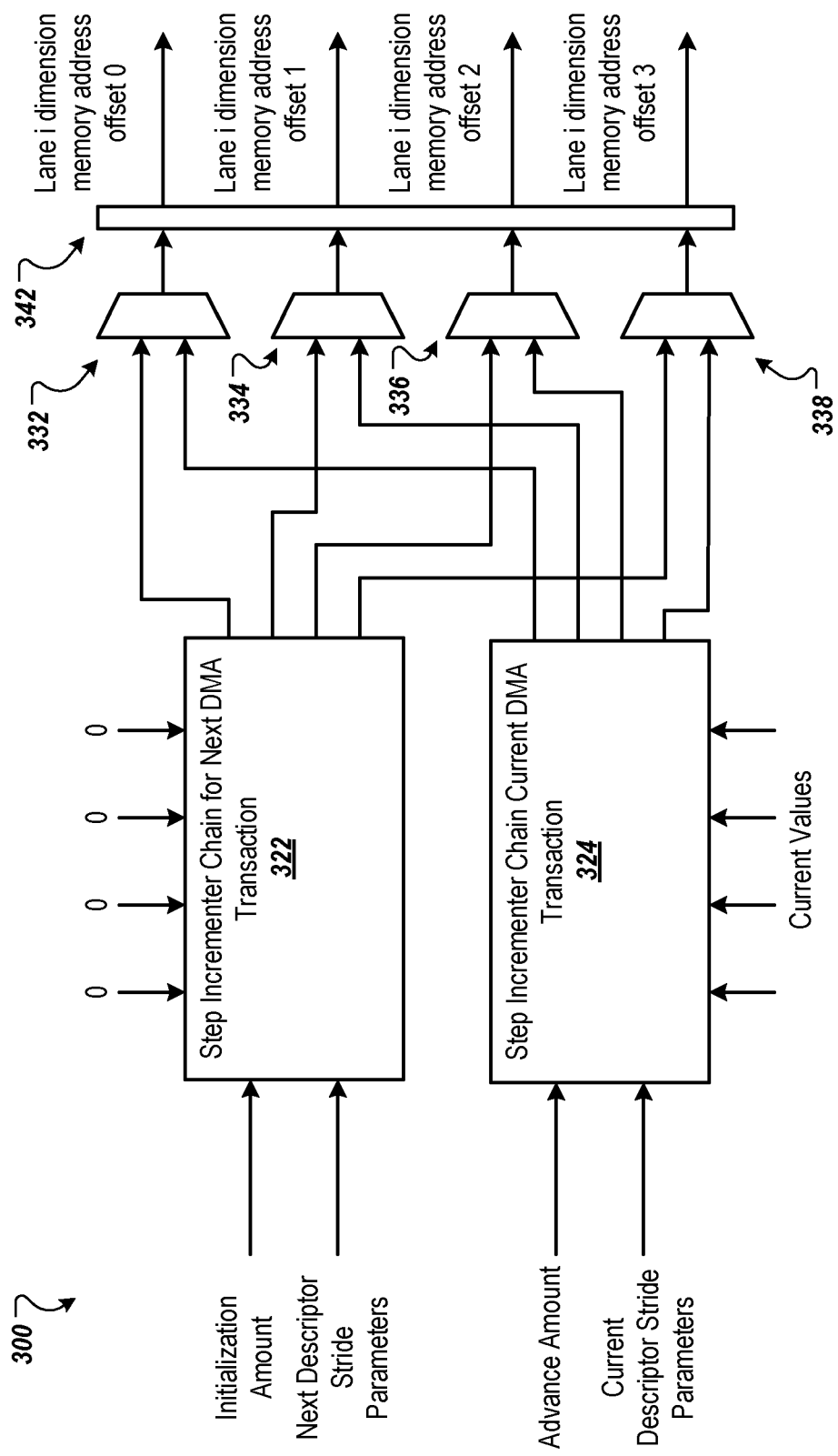
FIG. 3 is a diagram of an example step tracker.
Figure 4:
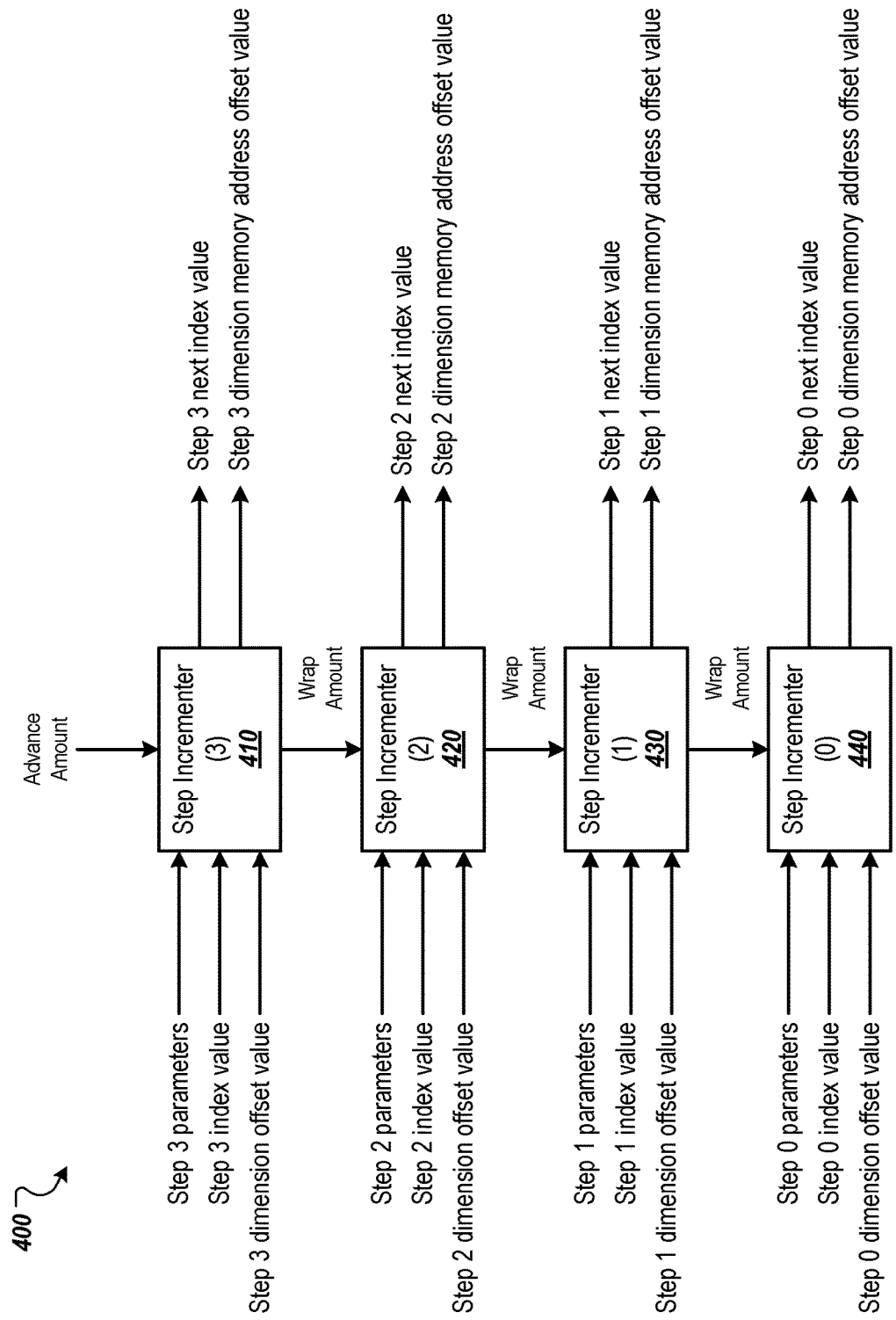
FIG. 4 is a diagram of an example step incrementer chain.
Figure 7:
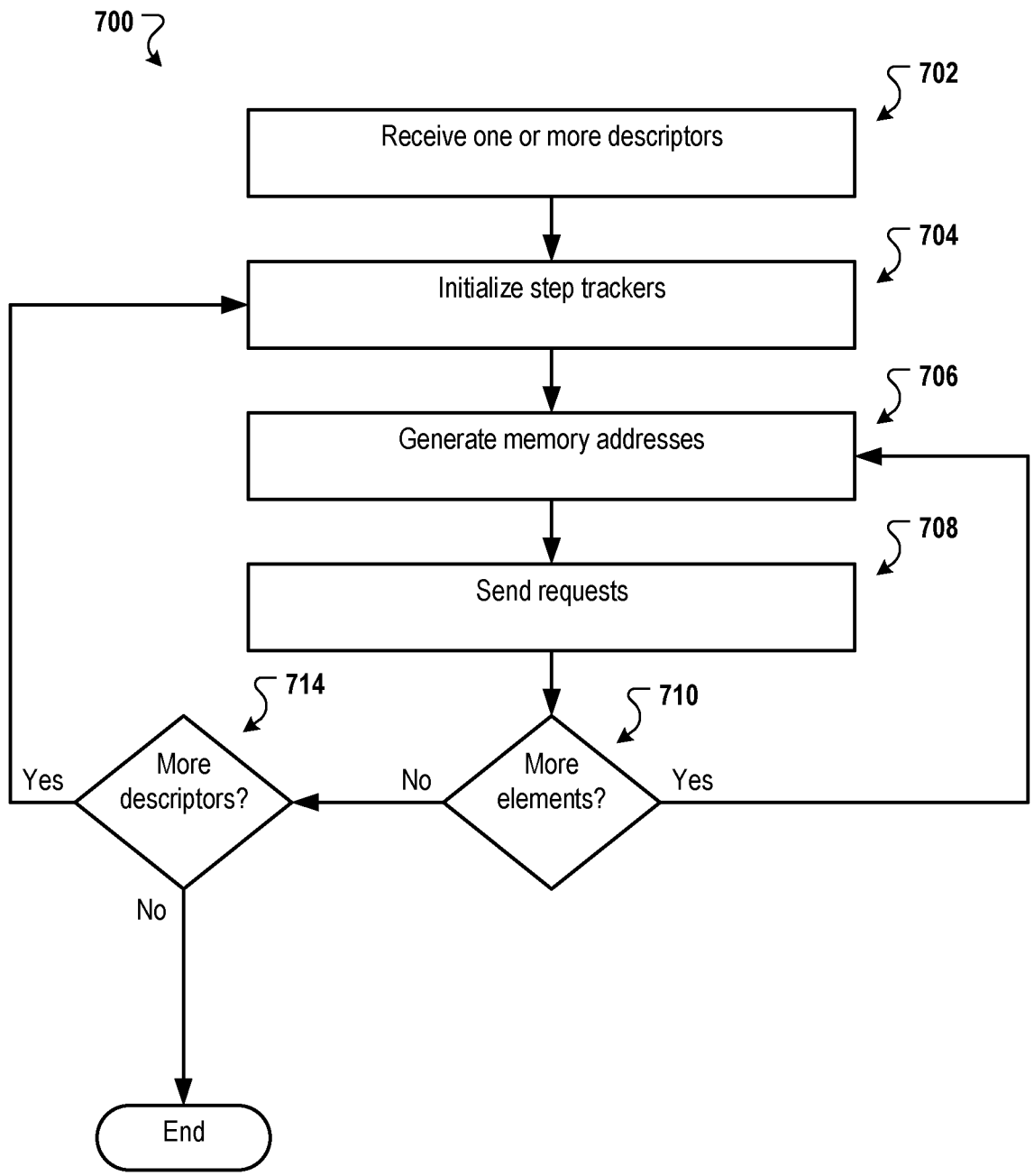
FIG. 7 is a flow diagram that illustrates an example process for generating requests for memory operations.

The step trackers 222-228 can determine their respective dimension memory address offset values in parallel with each other and independent of each other. That is, in some implementations, the step trackers 222-228 do not communicate any data to any other step tracker 222-228. Instead, each step tracker 222-228 can be configured to determine its next tensor element (e.g., the step index values for its next tensor element) based on the initialization of the step tracker 222-228 and the advance amount received from the FSM 232, as described in more detail below. In this way, neither step tracker 222-228 has to wait on another step tracker 222-228 and the parallel computations can be completed by all step trackers 222-228 in a single clock cycle. Example architectures of step trackers and techniques for determining the dimension memory address offset values are illustrated in FIGS. 3, 4, and 7 and described below.

Each memory address computation element 252-258 includes a first summation element 262A-268A and a second summation element 262B-268B. Each first summation element 262A-268A can determine a sum of the dimension memory address offset values received from its step tracker 222-228 for each parallel memory address computation cycle. For example, the summation element 262A can determine the sum of the four dimension memory address offset values generated by the step tracker 222 for a given tensor element. The first summation elements 262A-268A can be implemented as hardware adders.

The second summation elements 262B-268B, which can also be implemented as hardware adders, can determine a memory address for a tensor element based on a base address and the sum of the dimension memory address offset values computed by its corresponding first summation element 262A-268A. For example, summation element 262B can determine a memory address for a given tensor element by adding the base address to the sum of the four dimension memory address offset values generated by the step tracker 222 for the given tensor element.

The second summation elements 262B-268B can output their memory addresses to a register 270. A request transmitter 290 can generate a request for each memory address and send the requests to a memory system, e.g., the memory system 150 of FIG. 1. A request can include a request ID and the memory address. The request IDs can be allocated to requests in order. For example, if the DMA thread is configured to have 500 requests outstanding at a time, the request IDs can start at 0 or 1 and go up to 499 or 500, respectively. If 0-499 are used, the first request can include request ID 0, the second request can include request ID 1, and so on. The request transmitter 299 can include a counter that determines the request ID for each request.

The four lanes 201-204 can each generate a memory address for a tensor element in parallel during a single clock cycle. The FSM 232 can control the step trackers 222-228 of the lanes 201-204 to iterate through each tensor element of the tensor until a memory address is computed for each tensor element in the tensor. When finished issuing requests for a descriptor, the FSM 232 can move to the next descriptor. However, the FSM 232 does not have to wait for responses to all of the requests to be received. If there are at least a threshold number of sequential request IDs available (e.g., for which responses have been received), the progress tracker 132 or 134 can notify the request generator 200 so that the request generator 200 can issue requests for the next descriptor using those available request IDs. This further increases the throughput and efficiency of the DMA thread.

As described above, the request generators 132 and 134 of both DMA subthreads 132 and 134 can be implemented using the request generator 200. In this example, each subthread 132 and 134 would be capable of sending four requests per clock cycle.

FIG. 3 is a diagram of an example step tracker 300, which can be used to implement each of the step trackers 222-228 of FIG. 2A. In this example, the step tracker 300 includes two incrementer chains 322 and 324 that can perform the same or similar functions to generate step index values and dimension memory address offset values for tensor elements. This allows for one of the step incrementer chains to actively determine dimension memory address offset values for a current descriptor begin processed by the DMA thread, while the other step incrementer chain is initialized for the next descriptor to be processed by the DMA thread.

For example, the step incrementer chain 324 can be actively determining the dimension memory address offset values for a current descriptor. The step incrementer chain 324 can use an advance amount received from a FSM, e.g., the FSM 232 of FIG. 2, and stride parameters (as defined by the descriptor) to determine the dimension memory address offset values for the current descriptor. While the step incrementer chain 324 is active, the FSM can initialize the step incrementer chain 322, as described below with reference to FIG. 4.

While the last cycle of memory addresses is requested for the current descriptor, the FSM can switch to the initialized step incrementer chain 322 and send the step incrementer chain 322 an initialization amount. The step incrementer chain 322 can generate a first set of dimension memory address offset values on the very next clock cycle after the clock cycle in which the step incrementer chain 324 determines its last set of dimension memory address offset values. Using two step incrementer chains in this way can significantly improve the throughput and efficiency of the DMA threads, especially for small tensors. For example, if it only takes the request generator three clock cycles to determine all of the memory addresses for the tensor, using a clock cycle to re-initialize a single step incrementer chain between tensors results in a 25% decrease in the throughput (e.g., the number of memory operations performed per unit time).

When switching between step incrementer chains 322 and 324, the FSM can control a set of multiplexers 332-338 to select which step incrementer chain's output is sent to the memory address computation units via a register 342. For example, the FSM can select the top lane of each multiplexer 332-338 when the incrementer chain 322 is active and the bottom lane of each multiplexer 332-338 when the incrementer chain 324 is active.

As described above with reference to FIG. 2B, each lane 201-204 includes a step tracker that can be implemented as the step tracker 300. In this example, the step tracker 300 is for lane 0 and outputs the four dimension memory address offset values for lane 0.

Although not shown, each step tracker 300 can also output the next step index values used to determine the dimension memory address offset values. These next step index values are input back to the step tracker 300 for use in determining the subsequent step index values and dimension memory address offset values. That is, the step incrementer chain 324 can determine the step index values for each dimension and the dimension memory address offset value for each dimension. These values can be fed back to the step incrementer chain 324 as the current values that will be used to determine the next values.

The step tracker 300 can also include multiplexers for the step index values that receives, for each dimension, a step index value from both step incrementer chains 322 and 324, similar to how the multiplexers 322-338 receive dimension memory address offset values from both step incrementer chains 322 and 324. The output of these multiplexers can be fed into the step incrementer chain 324 for use in determining subsequent step index values.

While the step incrementer chain 324 computes the dimension memory address offset values for the current descriptor, the step incrementer chain 322 can determine the dimension memory address offset values for the first set of memory addresses for the next descriptor using the initialized state. However, the FSM can control the multiplexers 332-338 to pass the dimension memory address offset values received from the step incrementer chain 324. When the current descriptor is completed, the FSM can control the multiplexers 332-338 to pass the dimension memory address offset values computed by the step incrementer chain 322 for one cycle, which would include the values for the first four tensor elements of the next tensor. The FSM can also control the multiplexers for the step index values to pass the step index values from the step incrementer 322 to the step incrementer chain 324 for this one cycle. After that, the step incrementer chain 324 has the current state of the step index values and can determine the dimension memory address offset values for the remaining cycles for this descriptor. After the first cycle for this descriptor is completed, the FSM can control the multiplexers to once again pass the outputs of the step incrementer chain 324.

FIG. 4 is a diagram of an example step incrementer chain 400. The step incrementer chain 400 can include a step incrementer for each dimension of the largest tensor for which the DMA thread is configured to handle. In this example, the step incrementer chain 400 includes four step incrementers 410-440 for up to four dimensional tensors. The example step incrementer chain illustrated in FIG. 4 is implemented as a combinational function, similar in style to a carry-ripple adder circuit.

Each step incrementer 410-440 can receive a set of parameters. The set of parameters for a step incrementer 410-440 can include the steps-per-stride for the dimension corresponding to the step incrementer 410-440 and each step comparison value for the dimension that was pre-computed by the computation elements 210. The step incrementers 410-440 can be initialized for each descriptor as these values can vary based on the size and shape of the tensor for which the DMA transaction is being performed.

Each step incrementer 410-440 can also receive a step index value for its dimension and a dimension offset value for the dimension. The step index value for the dimension can be initialized at zero for the first cycle (as shown by the input values to the step incrementer chain 322). After the first cycle, the step index value that is inputted to the step incrementer 410-440 is the next step index value output by the step incrementer 410-440. As described above, the dimension offset value for a dimension is the value multiplied by the step index value to determine the dimensions memory address offset value. In comparison to using the four loops of the pseudocode 280 of FIG. 2B, the step incrementer 410 functions similarly to the innermost loop of the loop nest. However, rather than increment the step index by one for each iteration of the loop, the step incrementer 410 increments its step index value based on the advance amount received from the FSM. For example, if the advance amount is four, the step incrementer 410 would increment the step index value for its dimension by four. If this increment exceeds the steps-per-stride for the dimension, then the step incrementer can re-initialize the step index value to zero and keep incrementing until it has been incremented four times, which can include more than one re-initialization. For example, if the steps-per-stride is three and the advance amount is four, the step incrementer 410 would increment from zero to three, reinitialize to zero, increment from zero to one after the four increments.

Rather than use stateful iterations, the step incrementer 410 can use a combinatorial function that behaves similar to a pair of optimized adders. Like an adder, part of the step incrementer takes two operands ("step 3 index" and "advance_amount") and produces a sum ("step 3 next index") and a carry-out ("wrap amount"). The functionality is similar for the dimension offsets, except that the function that computes the next dimension offset does not produce the wrap amount output.

The step incrementer 410 can output the wrap amount to the step incrementer 420. The wrap amount can be equal to the number of times the step index value of the step incrementer 410 would have reinitialized in the current cycle based on the received advance amount. That is, the wrap amount reflects the number of times the four loops would have wrapped around based on the advance amount.

For each cycle in which the step incrementers 410-440 compute their dimension memory address offset values, e.g., during a single clock cycle, the step incrementer 410 can compute the next step index value for its dimension, the wrap amount for the step incrementer 420, and the dimension memory address offset value (e.g., the product of the next step index value and the dimension offset value for the dimension).

The step incrementer 420 can use the wrap amount received from the step incrementer 410 similar to the way in which the step incrementer 420 used the advance amount received from the FSM. That is, the wrap amount represents the number of times the step index value of the dimension corresponding to the step incrementer 420 is to be incremented this cycle. The step incrementer 420 can increment its step index value using the wrap amount received from the step incrementer 410 to determine the next step index value. The step incrementer 420 can also determine its dimension memory address offset value using the next step index value (e.g., the product of the next step index value and the stride dimension offset value for the dimension).

Similar to the step incrementer 410, the step incrementer 420 can also compute and output a wrap amount to the step incrementer 430. The wrap amount can be equal to the number of times the step index value of the step incrementer 420 was reinitialized in the current cycle based on the received wrap amount from the step incrementer 410. That is, the wrap amount reflects the number of times the four loops would have wrapped around based on the received wrap amount.

The step incrementer 430 can use the wrap amount received from the step incrementer 420 in a similar manner. That is, the wrap amount represents the number of times the step index value of the dimension corresponding to the step incrementer 430 is to be incremented this cycle. The step incrementer 430 can increment its step index value using the wrap amount received from the step incrementer 420 to determine the next step index value. The step incrementer 430 can also determine its dimension memory address offset value using the next step index value (e.g., the product of the next step index value and the stride dimension offset value for the dimension).

Similar to the step incrementer 420, the step incrementer 430 can also compute and output a wrap amount to the step incrementer 440. The wrap amount can be equal to the number of times the step index value of the step incrementer 430 was reinitialized in the current cycle based on the received wrap amount from the step incrementer 420. That is, the wrap amount reflects the number of times the four loops would have wrapped around based on the received wrap amount.

The step incrementer 440 can use the wrap amount received from the step incrementer 430 in a similar manner. That is, the wrap amount represents the number of times the step index value of the dimension corresponding to the step incrementer 440 is to be incremented this cycle. The step incrementer 440 can increment its step index value using the wrap amount received from the step incrementer 430 to determine the next step index value. The step incrementer 440 can also determine its dimension memory address offset value using the next step index value (e.g., the product of the next step index value and the stride dimension offset value for the dimension).

For each cycle in which the step incrementers 410-440 compute their dimension memory address offset values, e.g., during a single clock cycle, the step incrementers 410-440 can each compute the next step index value for its dimension, the wrap amount for the next step incrementer (if appropriate), and the dimension memory address offset value (e.g., the product of the next step index value and the stride dimension offset value for the dimension).

In some implementations, each incrementer 410-440 can use a set of criteria in determining the next step index value for its dimension and/or the wrap amount for its dimension. This criteria can include the increment amount (e.g., the advance amount for incrementer 410 or the wrap amount for the incrementers 420-440). The criteria can also include the steps per stride for the dimension, and a comparison of the current step index value to a step comparison value.

For example, a table, e.g., a lookup table, can be generated that specifies what the next step index value will be and the wrap amount will be for each particular combination of increment amount, steps per stride, and which step comparison value the current step index value matches. The particular combinations can differ based on the number of dimensions of the tensors for which the request generator can generate memory addresses. In this way, each step incrementer 410-440 can simply compare the increment amount and current step index value to the table to determine what the next step index value and wrap amount will be.

Figure 5:
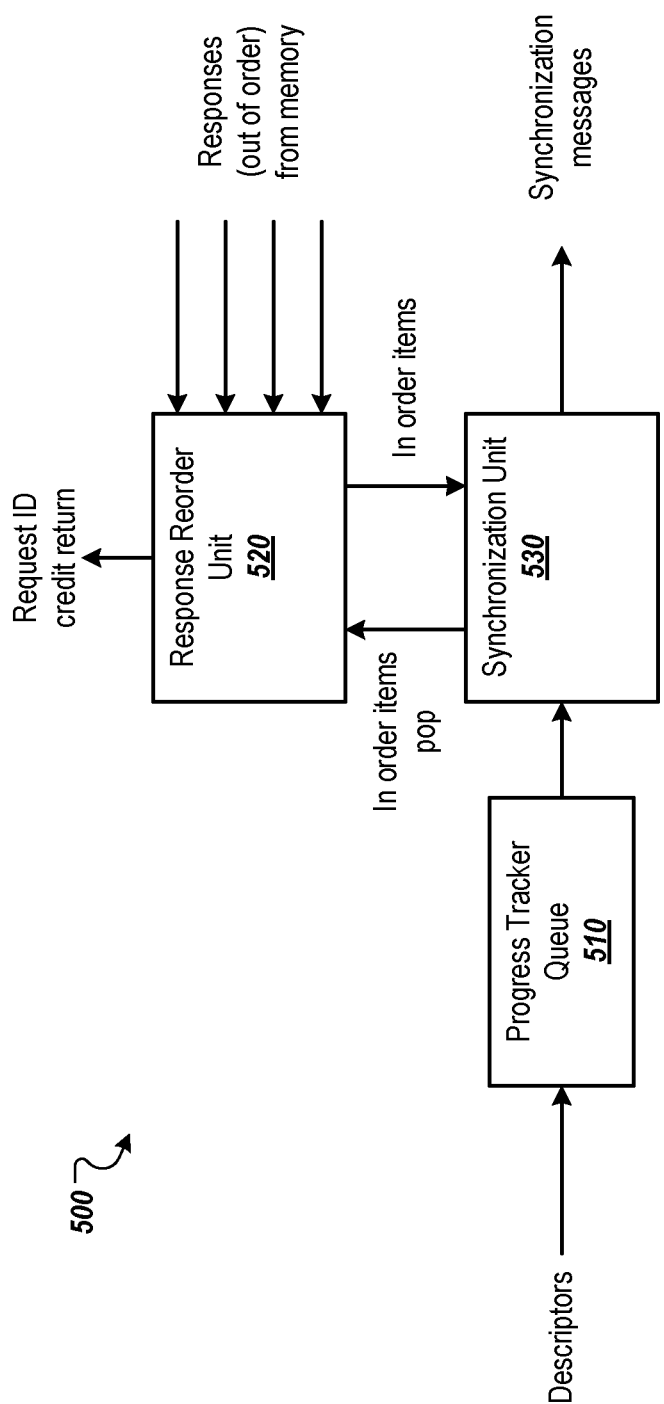
FIG. 5 is a diagram of an example progress tracker.

FIG. 5 is a diagram of example progress tracker 500, which can be used to implement each of the progress trackers 134 and 144 of FIG. 2A. The progress tracker 500 includes a progress tracker queue 510, a response reorder unit 520 and a synchronization unit 530.

The progress tracker queue 510 can receive descriptors (or the relevant part of descriptors that it needs to handle responses and synchronization) from a descriptor and store the descriptors. The descriptors enable the synchronization unit 530 to determine the progress of the DMA transactions defined by the descriptors, as described below.

The response reorder unit 520 can receive responses received from a memory system, e.g., the memory system 150 of FIG. 1. Each response can specify a request ID of a request that corresponds to the response. That is, the memory system can send, to the progress tracker 500, a response to each completed request received from the request generator that corresponds to the progress tracker 500.

Figure 6:
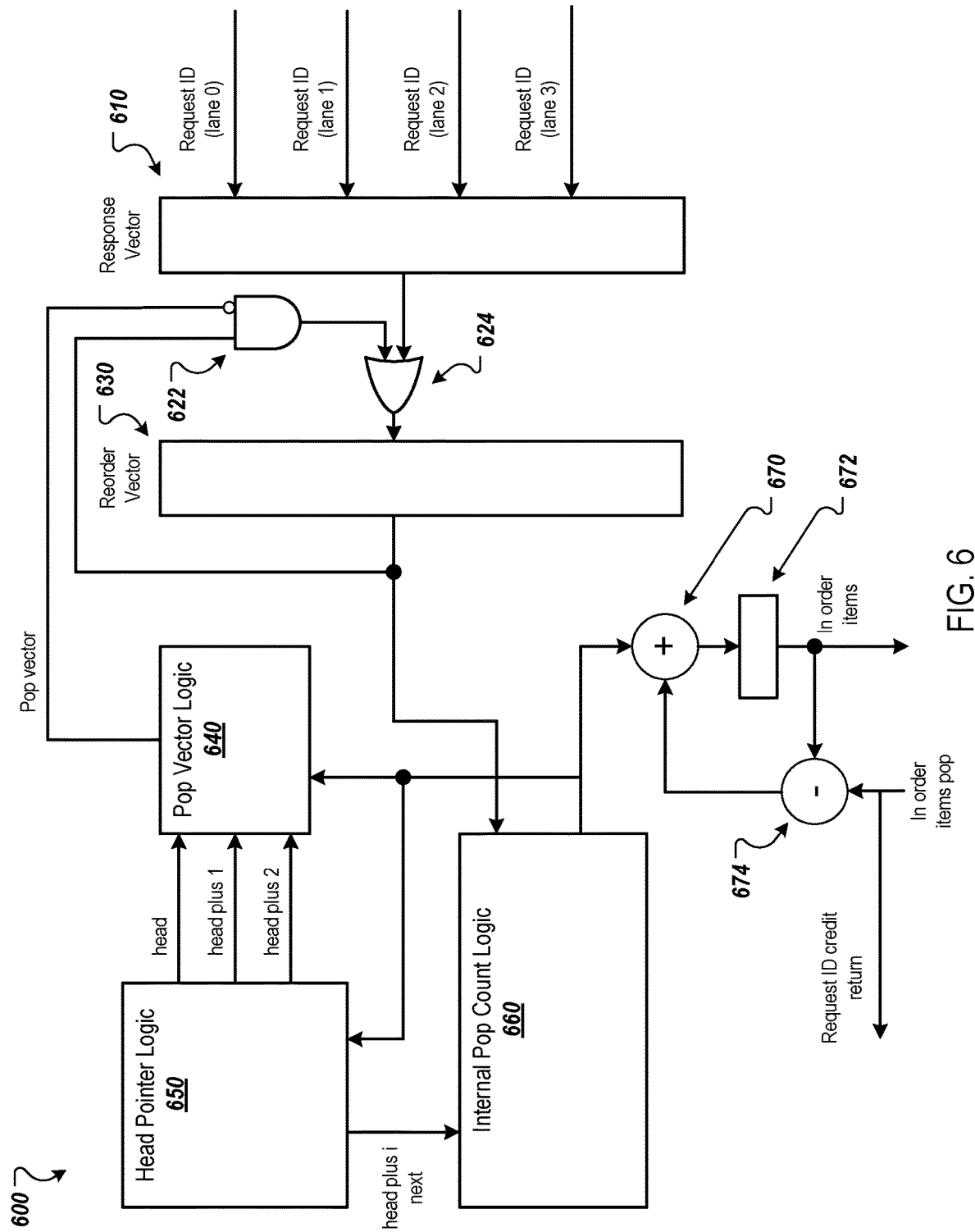
FIG. 6 is a diagram of an example response reorder unit.

The response reorder unit 520 can receive the responses in any order and reorder the responses based on their request IDs. The memory system can process requests in different orders then the order in which the requests are received. For example, the memory system can use bandwidth optimization techniques to prioritize some requests over other requests. In view of this, the response reorder unit 520 can be configured to receive out of order responses and reorder the responses to track the progress of the memory operations being completed by the memory system. An example response reorder unit is illustrated in FIG. 6 and described in more detail below.

The synchronization unit 530 can receive progress data from the response reorder unit and send synchronization messages to the core, e.g., to the core 110 of FIG. 1. For example, the synchronization unit 530 can receive, from the response reorder unit 520, data specifying a number of in order request IDs have been received. The synchronization unit 530 can be configured to send a synchronization message each time at least a threshold amount (or threshold percentage) of the memory operations defined by the descriptor have been completed. For example, the synchronization unit 530 can determine a total number of memory operations (e.g., read or write depending on the subthread) to be performed for the current descriptor. The synchronization update unit 530 can be configured to send a synchronization message to the core each time at least 10% of the memory operations have been completed. As described above, the core can use these partial updates to start consuming the transferred data without waiting for all of the memory operations defined by a descriptor to be completed.

The response reorder unit 520 and/or the synchronization unit 530 can be configured to notify the request generator of a set of request IDs can be reused by the request generator. For example, each time at least a threshold number of in order request IDs have been received in responses from the memory system, these request IDs can be released to the response generator for reuse. This enables the request generator to continue generating requests after the request generator has sent the maximum number of requests that can be handled by the progress tracker 500, but before all the requests have been completed.

For example, assume that the progress tracker 500 includes a response reorder buffer that can only track 500 memory operations at one time and the request IDs are 0-499. If all 500 memory operations have been used in requests and none of the requests have been responded to, the request generator has to stall until it receives a notification from the progress tracker 500 specifying available request IDs. If the progress tracker 500 receives responses for request IDs 0-15 (but not for all of the identifiers) and the threshold is less than 15, the progress tracker 500 can send a notification (e.g., a request ID credit return message) specifying that the request generator can resume sending requests using request IDs 0-15 without waiting for all 500 memory operations to be completed.

FIG. 6 is a diagram of an example response reorder unit 600, which can be used to implement the response reorder unit 520 of FIG. 5. The response reorder unit 600 includes a response vector 610 and a reorder vector 630, each of which can be implemented using a bit-vector register. The response vector 610 and the reorder vector 630 can each include a bit for each request ID that can be issued by the request generator. This bit can indicate the status of the request ID. For example, if the bit has a value of zero, the response for the memory operation has not been received. If the bit has a value of one, a response for the memory operation has been received. The response vector 610, the reorder vector 630, and a pop vector (described below) can all be the same size, e.g., include the same number of bits.

The response vector 610 can be configured to receive multiple responses at a time, e.g., up to four responses at a time in this example. For example, the response vector 610 can be configured to receive a number of simultaneous responses that matches the number of lanes of the corresponding request generator. In other examples, the response vector 610 can be configured to receive a number of simultaneous responses that differs from the number of lanes of the corresponding request generator, e.g., that is more than the number of lanes.

The bits in the reorder vector 630 can be arranged in order by the request IDs. At the input of the reorder vector 630 is a logical OR gate 624. The OR gate 624 can be a bit-vector OR gate that includes an OR gate for each bit of the reorder vector 630. For each request ID, the bit of the response vector for the request ID and a bit for the request ID output by an AND gate 622 (e.g., a bit-vector AND gate) can be the input to an OR gate to determine the value of the bit for the request ID in the reorder vector 630.

This AND gate 622 has a pair of inputs for each request ID, and thus each bit of the reorder vector 630. For a given request ID, if the bit in the reorder vector 630 and a pop bit for the request ID in a pop vector maintained by pop vector logic 640 both have a value of one, the output of the AND gate is a one for the given request ID. As described below, the pop bit for a memory address can be set to one to clear the bit back to a value of zero, e.g., when the request ID is released for use by the request generator. That is, if the response for the request ID is received and the request ID has not yet been released, the output of the AND gate 622 for the bit corresponding to the request ID would be a one. If the request ID has been released, the output of the AND gate 622 for the bit would be a zero as the input from the pop vector would be a one.

The response reorder unit 600 also includes head pointer logic 650, the pop vector logic 640, and internal pop count logic 660. The head pointer logic 650 can maintain a pointer at the next bit after the bit in the reorder vector 630 for the highest in order request ID for which a response has been received. The in order request IDs can start at the first request ID and extend through each sequential request ID for which a response has been received until it reaches a request ID for which a response has not been received. For example, if the request IDs include 0-499 and responses have been received for 0-8, 11, 56, and 61-78, the in order request IDs would be 0-8. In this example, the head pointer would point to the bit for request ID 9. Once responses are received for request IDs 9 and 10, the in order request IDs would be 0-11, assuming a response has not yet been received for request ID 12.

The head pointer logic 650 can also precompute additional head pointers, such as head pointer plus one (e.g., the next bit after the bit to which the head pointer is pointing, head pointer plus two, and so on. In this way, the pop count logic 660 can pop more than one bit in the reorder vector 630 during a single clock cycle. This is an optional feature that can be used to meet the timing of a given clock frequency. The logic complexity grows substantially for a large reorder vector with many responses per cycle. This precomputation can be used when the target frequency is relatively fast or when there are many responses per cycle (e.g., many lanes).

The internal pop count logic 660 can monitor the bits in the reorder vector 630 to determine how many bits of the reorder vector can be popped (e.g., cleared) when the head pointer moves. For example, the internal pop count logic 660 can look ahead at any strings of bits with a value of one indicating that a response has been received for the memory operations corresponding to the bits. When the head pointer logic 650 moves to another bit, the head pointer logic 630 can provide the location (e.g., the bit) to where the head pointer is moving (e.g., head_plus_i_next). Based on the new position of the head pointer and the monitored bits, the internal pop count logic 660 can determine how many bits can be popped, e.g., up to a maximum number of pops per clock cycle. For example, if the head pointer can move up ten bits and the maximum number of pops is four bits per clock cycle, the internal pop count logic 660 can instruct the pop vector logic 640 to pop four bits a first cycle, four bits a second cycle, and two bits a third cycle. The head pointer will increment by the same number of entries that are popped that cycle, so in this example it can advance by up to four per cycle.

The pop vector logic 640 can maintain a pop vector of the bits that are to be popped and provide this pop vector as an input to the AND gate 622. The pop vector logic 640 can determine which bits to pop based on the head pointer and the additional head pointers and the number of bits to pop received from the internal pop count logic 660. For example, if the number of bits to pop is four, the pop vector logic 640 can pop the bits from the current head pointer to head pointer plus four. As the value of head pointer plus four is already computed, the pop vector logic 640 does not have to consume clock cycles to determine the location of the bits to pop.

The head pointer logic 650 can also receive, from the pop count logic, the number of bits to be popped. The head pointer logic 650 can update the head pointer and precompute the additional head pointers based on the number of bits to be popped.

The response reorder unit 600 also includes an in order items register 672 and computation elements 670 and 674. The in order items register 672 can maintain a count of the number of in order items that have been popped, but that have not yet been released to the request generator. To do so, the computation unit 670 aggregates the number of bits that have been popped based on the output of the internal pop count logic 660.

The number of in order items in the register 672 is also sent to the synchronization unit 530. The synchronization unit 530 can determine, based on the number of in order items that have been popped, when to release request IDs to the request generator. For example, the synchronization unit can send data specifying a quantity of request IDs that can be used by the request generator, e.g., the request ID credit return). The computation unit 674 can subtract this number from the number of in order items currently in the register 672 and update the register with the result (plus any newly popped items from the internal pop count logic 660). For example, if the register 672 indicates that there have been 15 in order items popped and the synchronization unit 530 releases 10 to the request generator, the computation element 674 can subtract the 10 released request IDs from the 15 request IDs and store and update value of five request IDs. In this way, the register 272 stores a running count of the number of request IDs that can be released to the request generator.

FIG. 7 is a flow diagram that illustrates an example process 700 for generating requests for memory operations. The process 700 can be performed by a request generator, e.g., the request generator 132 or 142 of FIG. 1, or the request generator 200 of FIG. 2.

The request generator receives one or more descriptors (702). Each descriptor includes information about a DMA transaction, e.g., a set of memory transfer operations. For example, a descriptor can include information specifying source memory from which data will be read, destination memory to which the data will be written, the size and shape (e.g., the dimensions) of a source tensor for which tensor elements are stored in the source memory, a size and shape of a destination tensor for which tensor elements will be stored in the destination memory, and a stride dimension offset value for each dimension.

The request generator initializes step trackers (704). As described above, the request generator can include multiple lanes that each compute a memory address in parallel, e.g., per clock cycle. Each lane can include a step tracker and a memory address computation unit. Each step tracker can include a step incrementer chain. Initializing the step tracker can include providing step parameters to each step incrementer and initializing the step index value for each step incrementer.

The request generator generates memory addresses (706). For example, the request generator can use the multiple lanes to compute multiple memory addresses in parallel, e.g., during a single clock cycle. In particular, during a clock cycle, each step tracker can compute a next step index value for each dimension of the tensor (which corresponds to a particular tensor element in the tensor) and compute a dimension memory address offset value for each dimension using the next step index value for the dimension and the stride dimension offset value for the dimension. The memory address computation unit of each lane can then compute a memory address based on the dimension memory address offset value for each dimension output by the step tracker on the lane and a base address. For example, the memory address for a lane (and therefore a tensor element) can be the sum of the base address and the dimension memory address offset values.

The request generator generates and sends requests to a memory system (708). The requests can be read requests or write requests. Each request can specify a request ID and a memory address computed during this cycle. That is, the request generator can generate and send a respective request for each computer memory address. The request generator can send the requests to a memory system that performs the read or write operation using the memory address in the request.

The request generator determines whether there are more tensor elements for which to compute a memory address (710). For example, as described above, an FSM can track the number of requests remaining to be generated for a descriptor. If there are more tensor elements, the process 700 returns to step 706 to generate more memory addresses.

If there are no additional tensor elements, the request generator determines whether there are additional descriptors for which to perform DMA transactions (714). For example, the request generator can check a descriptor queue to determine whether there are any additional descriptors in the queue. If not, the process ends. If so, the process returns to step 704, where the step trackers are initialized for the next descriptor. As described above, the step trackers can be initialized prior to the completion of the DMA transaction for a previous descriptor.

Figure 8:
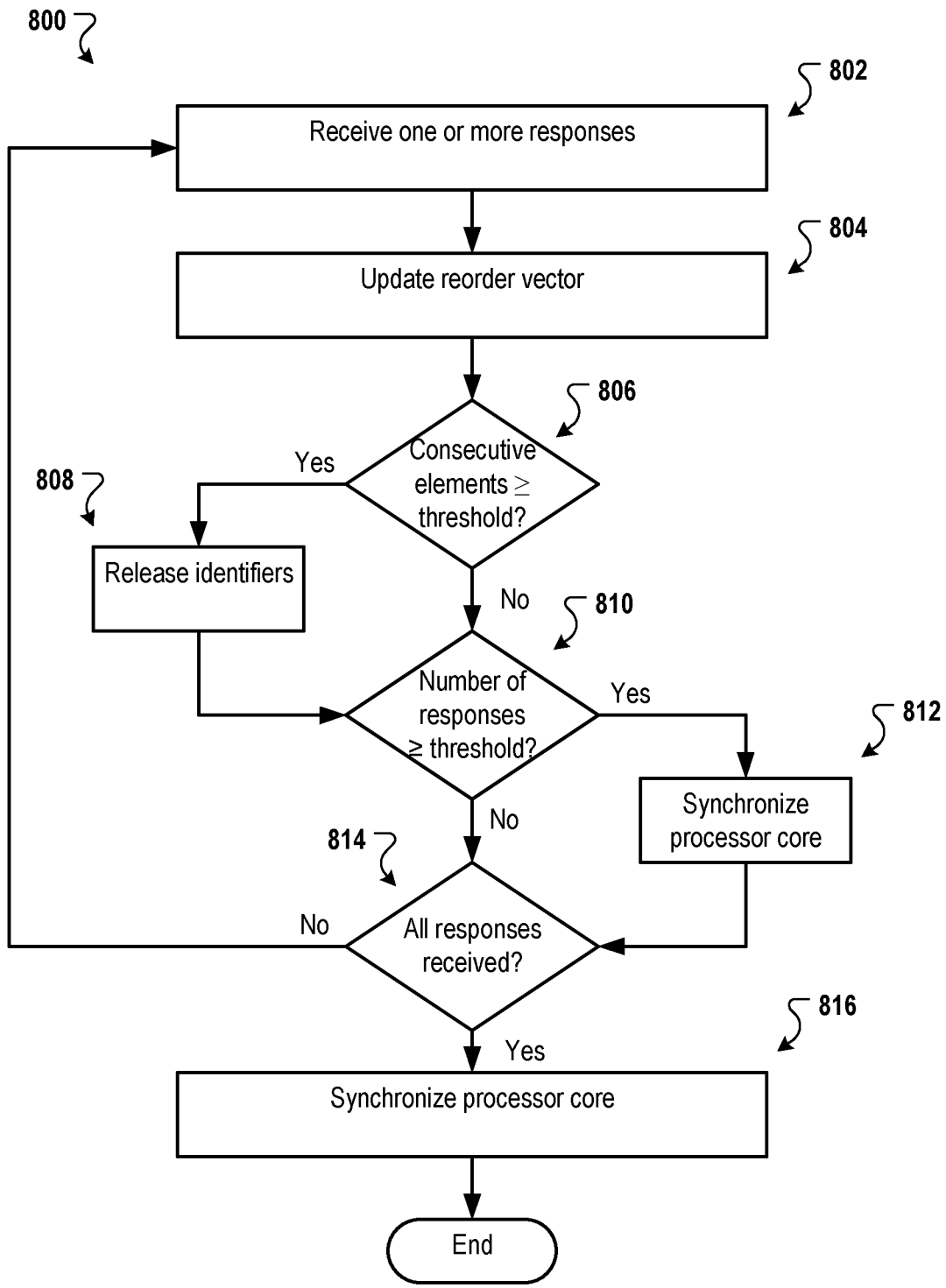
FIG. 8 is a flow diagram that illustrates an example process for tracking the progress of memory operations.

FIG. 8 is a flow diagram that illustrates an example process 800 for tracking the progress of memory operations. The process 800 can be performed by a progress tracker, e.g., the progress tracker 134 or 144 of FIG. 1, or the progress tracker 500 of FIG. 5.

The progress tracker receives one or more responses (802). For example, a memory system can send a response to the progress tracked in response to completing a memory operation. The response can specify the request ID for the completed memory operation.

The progress tracker updates a reorder vector (804). The progress tracker can update the reorder vector to indicate that the memory operation corresponding to the request ID has been completed. For example, the progress tracker can update a bit for the request ID from a value of zero to a value of one to indicate that the memory operation corresponding to the request ID has been completed.

The progress tracker determines whether a number of consecutive elements (e.g., bits for request IDs) is greater than or equal to a threshold (806). If so, the progress tracker can release the request IDs for reuse by a request generator (808). If not, the process 800 continues to step 810 without releasing any request IDs.

In step 810, the progress tracker determines whether a number of responses received is greater than or equal to a threshold. This number can be a number of responses received since a previous synchronization message was sent to a core for which the memory operations are being performed. In another example, the progress tracker can determine whether at least a threshold percentage of the total number of responses to be received have been received.

In either example, if the threshold has been reached or exceeded, the progress tracker can synchronize with the core (812). For example, the progress tracker can send, to the core, a synchronization message that indicates the total number or total percentage of responses received. In another example, the progress tracker can send, to the core, a synchronization message that indicates a number of responses received since a previous synchronization message was sent to the core.

If the threshold has not been reached, the process 800 continues to step 814. In step 814, the progress tracker determines whether all responses have been received for a descriptor. If not, the process 800 returns to step 802, in which more responses are received. If so, the progress tracker can synchronize with the core 816, e.g., by sending a synchronization message indicating that all of the memory operations for the descriptor have been completed.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A direct memory access (DMA) system, comprising:
one or more hardware DMA threads, wherein each DMA thread comprises:
a request generator configured to generate, during each parallel memory address computation cycle, (i) m memory addresses for a multi-dimensional tensor in parallel and, for each memory address, (ii) a respective request for a memory system to perform a memory operation for the multi-dimensional tensor, wherein the request generator comprises m memory address units, and wherein each memory address unit comprises:
a step tracker configured to generate, during each parallel memory address computation cycle, memory address offset values for a respective tensor element of the multi-dimensional tensor, the generating comprising determining, for each dimension of the multi-dimensional tensor, (i) a respective step index value for the dimension and, based on the respective step index value, (ii) a respective memory address offset value for the dimension, wherein the respective step index values for the dimensions of the multi-dimensional tensor correspond to a location of the respective tensor element within the multi-dimensional tensor; and
a memory address computation element configured to:
generate, during each parallel memory address computation cycle and based on the respective memory address offset value for each dimension, a memory address for the respective tensor element of the multi-dimensional tensor; and transmit, to the memory system, the request to perform the memory operation using the memory address;

wherein each step tracker generates step index values and memory address offset values for a different tensor element than each other step tracker during each parallel memory address computation cycle;

wherein m is greater than or equal to two.

2. The DMA system of claim 1, wherein the request generator is configured to generate the memory addresses in parallel during a single clock cycle and each parallel memory computation is performed during a single clock cycle.

3. The DMA system of claim 1, wherein the request generator is configured to receive, for the multi-dimensional tensor, a descriptor that defines, for each dimension, a respective steps for stride value for the dimension.

4. The DMA system of claim 1, wherein the request generator includes m lanes that each include a respective step tracker and a respective memory address computation element, wherein the respective step tracker and respective memory address computation element of each lane computes a corresponding memory address in parallel with each other lane.

5. The DMA system of claim 4, wherein:
the step trackers are configured to generate the memory addresses for the multi-dimensional tensor based on a loop nest that includes, for each dimension of the multi-dimensional tensor, a respective loop for traversing the dimension of the multi-dimensional tensor; and
the steps per stride value for each dimension represents a loop bound for the respective loop for the dimension and the step index value for each dimension represents a loop index for the respective loop for the dimension.

6. The DMA system of claim 5, wherein each step tracker is configured to update the step index value for each of the dimensions during each clock cycle.

7. The DMA system of claim 5, wherein a combination of the step index values for each step tracker is different from a combination of the step index values for each other step tracker.

8. The DMA system of claim 7, wherein:
each step tracker comprises a step incrementer chain comprising plurality of step incrementers each configured to determine a dimension memory address offset value for a respective dimension:
a first step incrementer of the step incrementer chain corresponding to an innermost loop of the loop nest is configured to receive an advance amount; and
updating the step index value for one or more of the dimensions during each clock cycle comprises updating, by the first step incrementer, the step index value for the one or more dimensions based on the advance amount.

9. The DMA system of claim 8, wherein:
each of one or more second step incrementers of the step incrementer chain corresponding to a loop in which the innermost loop is nested is configured to receive, from a previous step tracker in the step incrementer chain, a wrap amount; and
updating the step index value for one or more of the dimensions during each clock cycle comprises updating, by the second step incrementer, the step index value for the one or more dimensions based on the wrap amount.

10. The DMA system of claim 1, further comprising a progress tracker comprising a response reorder unit and a synchronization unit.

11. The DMA system of claim 10, wherein the response reorder unit is configured to maintain, for each tensor, a status of whether a memory operation for the tensor element has been performed.

12. The DMA system of claim 10, wherein the synchronization unit is configured to provide, to a processor core, multiple partial updates that each specify an overall status of memory operations performed on the tensor elements of the multi-dimensional tensor.

13. The DMA system of claim 10, wherein:
each request comprises a unique identifier;
the response reorder unit is configured to:
receive responses from the memory system in any order, each response comprising the unique identifier of the request for which the response is provided; and
release a set of unique identifiers for re-use by the request generator when at least a threshold number of consecutive unique identifiers are received in the responses.

14. A system, comprising:
one or more processor cores;
a memory system; and
a DMA engine comprising one or more DMA threads, wherein each DMA thread comprises:
a request generator configured to generate, during each parallel memory address computation cycle, (i) m memory addresses for a multi-dimensional tensor in parallel and, for each memory address, (ii) a respective request for a memory system to perform a memory operation for the multi-dimensional tensor, wherein the request generator comprises m memory address units, wherein m is greater than or equal to two, and wherein each memory address unit comprises:
a step tracker configured to generate, during each parallel memory address computation cycle, memory address offset values for a respective tensor element of the multi-dimensional tensor, the generating comprising determining, for each dimension of the multi-dimensional tensor, (i) a respective step index value for the dimension and, based on the respective step index value, (ii) a respective memory address offset value for the dimension, wherein the respective step index values for the dimensions of the multi-dimensional tensor correspond to a location of the respective tensor element within the multi-dimensional tensor; and
a memory address computation element configured to:
generate, during each parallel memory address computation cycle and based on the respective memory address offset value for each dimension, a memory address for the respective tensor element of the multi-dimensional tensor; and
transmit, to the memory system, the request to perform the memory operation using the memory address,
wherein each step tracker generates step index values and memory address offset values for a different tensor element than each other step tracker during each parallel memory address computation cycle; and a progress tracker comprising a response reorder unit and a synchronization update unit configured to provide, to the one or more processor core, partial synchronization updates for memory operations managed by the DMA engine.

15. The system of claim 14, wherein the request generator is configured to generate the memory addresses in parallel during a single clock cycle and each parallel memory computation is performed during a single clock cycle.

16. The system of claim 14, wherein the request generator is configured to receive, for the multi-dimensional tensor, a descriptor that defines, for each dimension, a respective steps for stride value for the dimension.

17. The system of claim 14, wherein the request generator includes m lanes that each include a respective step tracker and a respective memory address computation element, wherein the respective step tracker and respective memory address computation element of each lane computes a corresponding memory address in parallel with each other lane.

18. A method performed by a DMA system, the method comprising:
generating, by a request generator and during each parallel memory address computation cycle, (i) m memory addresses for a multi-dimensional tensor in parallel and, for each memory address, (ii) a respective request for a memory system to perform a memory operation for the multi-dimensional tensor, wherein the request generator comprises m memory address units, wherein m is greater than or equal to two, and wherein each memory address unit comprises a step tracker and a memory address computation unit;

generating, during each parallel memory address computation cycle and by the step tracker of each memory address unit, memory address offset values for a respective tensor element of the multi-dimensional tensor, the generating comprising determining, for each dimension of the multi-dimensional tensor, (i) a respective step index value for the dimension and, based on the respective step index value, (ii) a respective memory address offset value for the dimension, wherein the respective step index values for the dimensions of the multi-dimensional tensor correspond to a location of the respective tensor element within the multi-dimensional tensor;

generating, by the memory address computation element of each memory address unit and during each parallel memory address computation cycle, a memory address for a tensor element of the multi-dimensional tensor based on the respective memory address offset value for the tensor element of the multi-dimensional tensor; and transmitting, to the memory system, the request to perform the memory operation using the memory address, wherein each step tracker generates step index values and memory address offset values for a different tensor element than each other step tracker during each parallel memory address computation cycle.

* * * * *